United States Patent [19]

Braun

[11] 4,326,160
[45] Apr. 20, 1982

[54] CONTROL UNIT FOR STATIC CONVERTER

[75] Inventor: Rüdiger Braun, Erlangen, Fed. Rep. of Germany

[73] Assignee: Siemens Aktiengesellschaft, Berlin and Munich, Fed. Rep. of Germany

[21] Appl. No.: 77,151

[22] Filed: Sep. 19, 1979

[30] Foreign Application Priority Data

Sep. 28, 1978 [DE] Fed. Rep. of Germany ....... 2842278

[51] Int. Cl.³ ..................... G05F 1/455; H02M 7/515
[52] U.S. Cl. ................................. 323/241; 323/244; 363/135; 363/137
[58] Field of Search ............ 323/1, 237, 241, 244–246, 323/283, 320, 322; 363/128, 160, 17, 96, 135–137; 307/252 Q

[56]         References Cited
        U.S. PATENT DOCUMENTS 3,952,240  4/1976  Ruumpol ................................ 323/1
4,017,744  4/1977  Johnson ............................... 363/160
4,105,939  8/1978  Culbertson ...................... 363/137 X
4,128,771 12/1978  Domenico ....................... 323/283 X
4,204,149  5/1980  Cleary et al. .................... 323/241 X Primary Examiner—A. D. Pellinen
Attorney, Agent, or Firm—Kenyon & Kenyon

[57]         ABSTRACT

A digital control unit for a static converter contains a binary-coded counter which counts the pulses of an oscillator. The counter outputs are connected to the address inputs of a function memory in which sawtooth or ramp functions are stored. The numbers read out of the function memory are compared in a comparator, with a number determining the drive of the static converter. The result of the comparison and pulses on selected outputs of the counter are linked, in a logic circuit, to form firing pulses for the static converter. The invention is suitable for control units for static converters, in particular for AC control elements and inverters. All expense of adjusting, and all compensation of drift errors is obviated.

1 Claim, 11 Drawing Figures

CONTROL UNIT FOR STATIC CONVERTER

BACKGROUND OF THE INVENTION

This invention relates to control units for static converters. More particularly, it relates to control units for static converters using digital circuitry.

In known control units for static converters, the necessary voltage generators and comparators are designed in analog technique. Adjustment of the components used and compensation of drift errors are necessary.

It is an object of the present invention to provide a simple control unit for static converters that can be made without expense for adjustment.

SUMMARY OF THE INVENTION

The problem outlined above is solved according to the present invention by a circuit having the following features:

(a) An oscillator drives a binary-coded counter whose outputs are connected to the address inputs of a function memory;

(b) The data outputs of the memory are connected to the first comparator inputs of a comparator whose second comparator inputs are connected to a digital device determining the drive of the static converter;

(c) A logic circuit links the comparison result with one or more output signals of the counter to provide firing pulses for the controlled valves of the static converter.

The digital components used in a control unit according to the invention, such as counters, memories and logic elements, do not show significant unit-to-unit spreads in operation. Therefore, no adjustments whatever are necessary.

DETAILED DESCRIPTION OF THE INVENTION

The basic principle of a control unit according to the invention can be applied in control units for any desired static converter. In the following there will be described, as examples of construction, control units according to the invention for an AC control element and for a single phase and a three phase inverter. Therefrom also control units for other static converters, for example for controlled rectifiers, can be derived in a simple manner. The signals and voltages are marked with the designation of the lines or outputs on which they appear. The numerical data used in the following description serve only as explanation by way of example.

Figure 1:
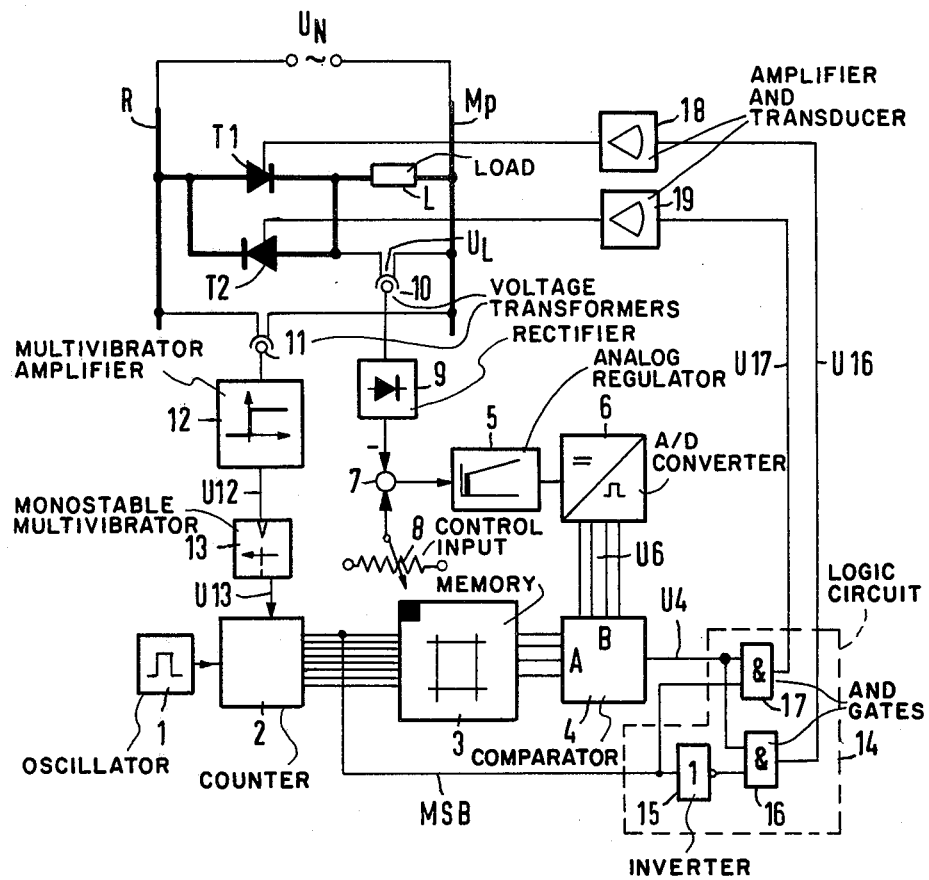
FIG. 1 is a block diagram of an AC control element with a control device including a control unit according to the invention.

FIG. 1 shows the application of the invention to an AC control element. Between phase R and ground (mass) Mp of an AC network having network AC voltage $U_N$ (see FIG. 2) and a network frequency of 50 Hz, there is connected an antiparallel circuit of thyristors T1, T2 in series with a load L. The thyristors T1, T2 are controlled by firing pulses which are formed by a control device having a control unit according to the invention.

The control unit comprises a binary-coded, 8-bit counter 2, operated as forward counter, whose counting pulse input is connected to a free-running oscillator 1. The constant pulse frequency of oscillator 1 is an integral multiple of the network frequency of the network AC voltage; in the illustrated embodiment, 12.8 kHz. The 8-bit counter 2 divides the oscillator frequency down. Each counter output has a pulse sequence the frequency of which is double that of its neighbor, with the highest value counter output MSB (Most Significant Bit) having a pulse sequence at a frequency of 50 Hz, coinciding with the network frequency (see FIG. 2).

Figure 2:
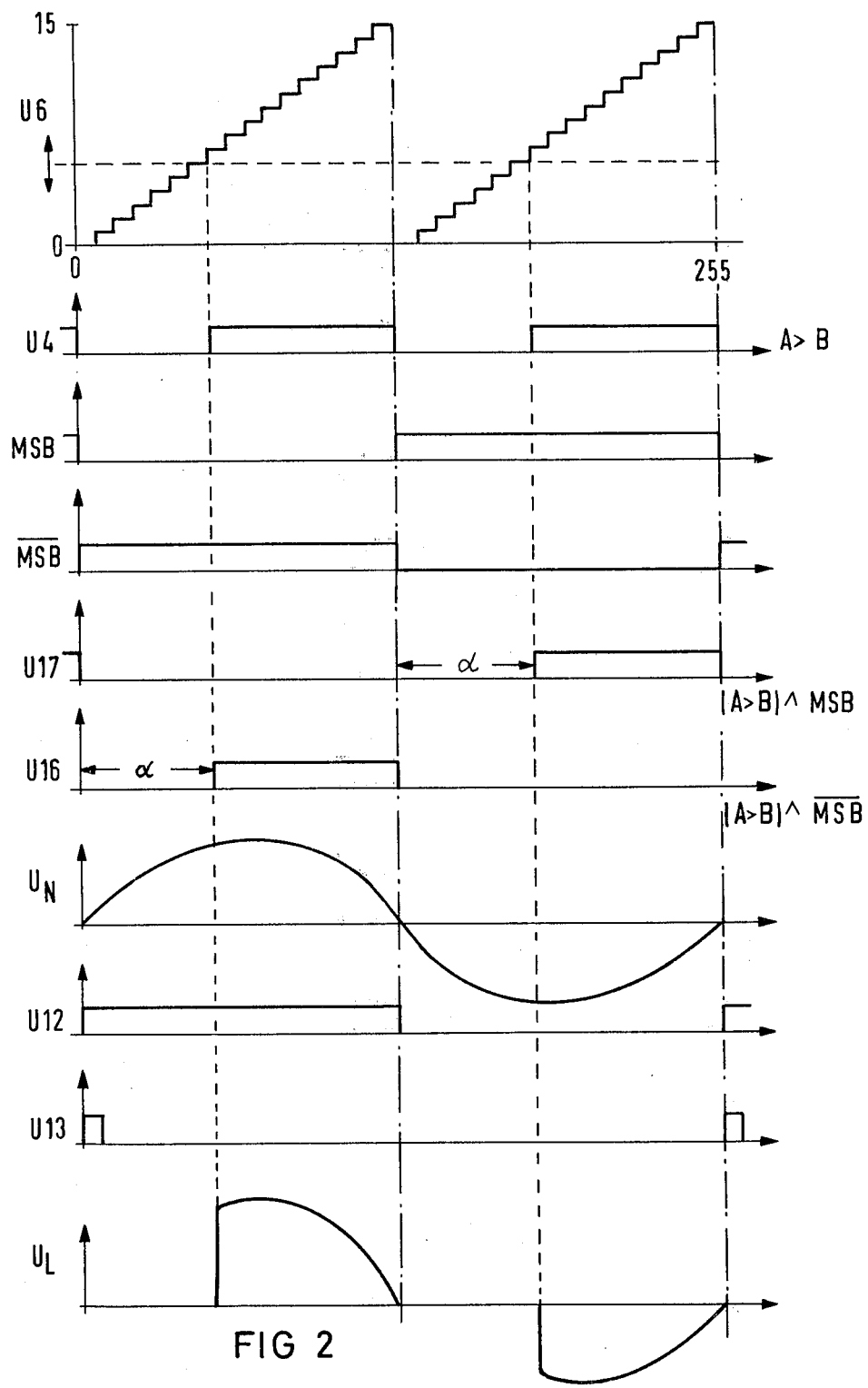
FIG. 2 illustrates essential wave forms in explanation of FIG. 1.

The counter outputs are connected to the address inputs of a function memory 3, shown in the illustrated embodiment as a 256×4 bit read-only memory (PROM). In the function memory 3, numbers are stored which represent a given sawtooth or ramp function. FIG. 2 shows at the top, a graph of the programming of the function memory 3. On the horizontal axis are ad-scribed the addresses, and, on the vertical axis, the numbers stored on the associated ordinate. For easier readibility the addresses 0 to 225 and the stored numbers 0 to 15 are indicated in decimal notation.

Counter 2 selects the addresses 0 to 255 of the function memory 3 successively and consecutively. At the memory outputs appear numbers which form, in the graph, two successive sawteeth of a stepped form caused by the digitalization. The numbers are fed to first comparator input A of a comparator 4 and are compared with a number U6 which is available at the second comparator input B and which determines the drive of the AC controller. Comparator 4 delivers an active output signal U4 (see FIG. 2) to a logic circuit 14 if the number A read out from the function memory 3 is greater than the drive-determining number B.

The number U6 available at the second comparator input B of comparator 4 is given by a suitable device for determining the drive of the AC control element, such as a digital setting device, a potentiometer with analog-digital converter, a regulating device, or a drive computer. In the illustrated embodiment, an analog regulator 5, which may be an amplifier, is provided whose reference point 7, which may be a summing junction having the inputs shown, is connected to a control input transmitter 8 and to a device for pickup of the controlled variable which consists of a voltage transformer 10 for the load voltage $U_L$ feeding a rectifier 9, and possibly an input filter. The output voltage of the regulator 5 is transformed in an analog-digital converter 6 into a binary number U6 between 0 and 15 and fed to the second comparator input B of comparator 4.

The logic circuit 14 contains two AND gates 16 and 17, one input of each being connected to the output of comparator 4. The second input of AND gate 16 is fed, via an inverting stage 15, from the highest value output MSB of counter 1. The second input of AND gate 17 is connected directly to the output MSB of counter 1. By the linkage of the output signal of comparator 4 with the signal MSB, the correlation of the firing pulses for the controlled thyristors T1, T2 to the half-waves of the network voltage is established. The output signal U16 of AND gate 16 energizes the control electrode of thyristor T1 via a schematically shown firing pulse amplifier 1 and transducer 18. The output signal U17 of AND gate 17 energizes the control electrode of thyristor T2 via a firing pulse amplifier and transducer 19. In each half-wave, the control angle alpha and hence the beginning of the current flow period of the load current is established by the comparison result A>B.

To synchronize the drive of the thyristors T1, T2 with the network AC voltage, as synchronization unit is provided, which comprises a voltage transformer 11, a multivibrator amplifier 12, and a monostable multivibrator stage 13. The multivibrator amplifier 12 furnishes an active output signal U12 when the network AC voltage is positive. The rising flank of the active output signal of amplifier 12 triggers the multivibrator stage 13, whose output signal U13, a short pulse, fed to the reset input, sets the counter 2 back.

In programming the function memory 3, other functions can also be introduced, for example ramp functions with slopes varying along the curve. In particular, also, non-linear relationships between the regulator output voltage and the desired drive can be taken into account by appropriate programming in a simple manner.

Figure 3:
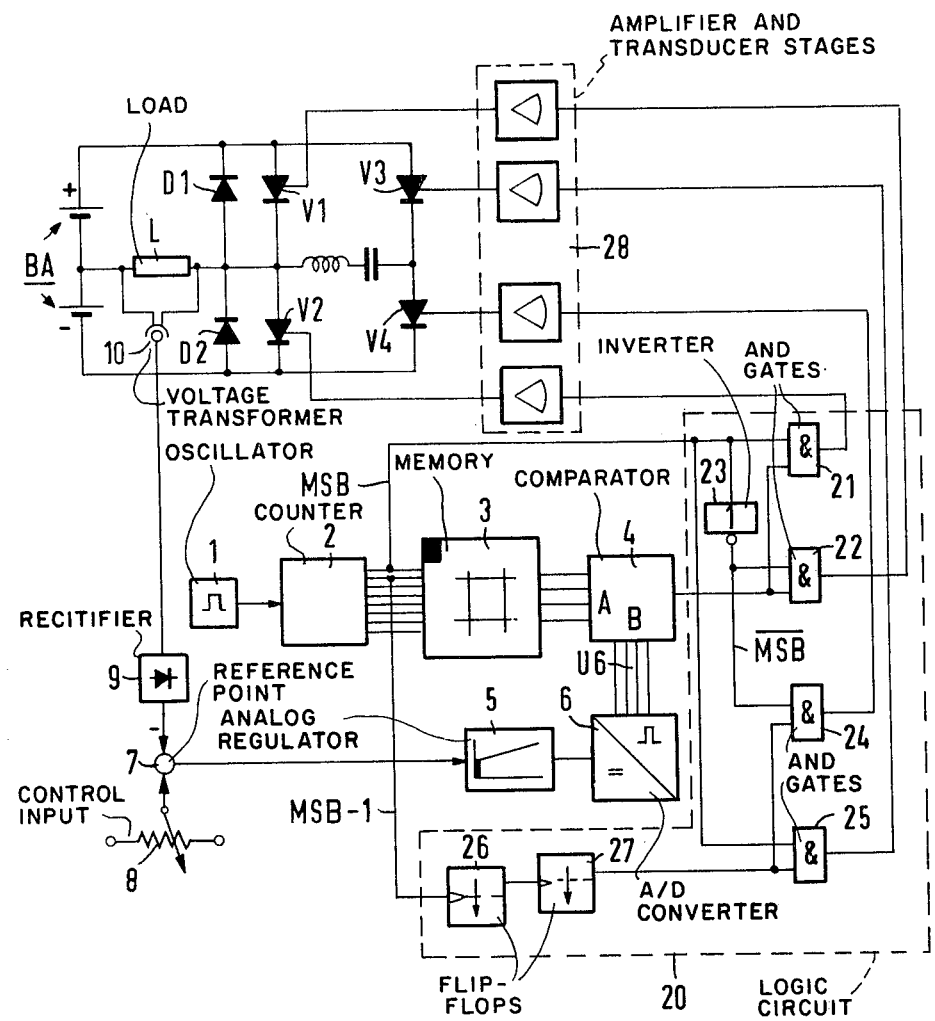
FIG. 3 is a block diagram of a single-phase inverter with a control device including a control unit according to the invention.

FIG. 3 shows the application of the invention to a single-phase inverter. Between the DC voltage bars of a DC voltage source BA is a series connection of the controlled main valves V1 and V2, to which back current diodes D1 and D2 are connected antiparallel. For commutation of the main valves an additional branch with the controlled quenching valves V3 and V4 and a common LC series resonant circuit are provided. The load L is connected between the center of the main valves V1, V2 and the center of the DC voltage source BA. The main valves V1, V2 and the quenching valves V3, V4 are controlled by a control device with a control unit according to the invention.

Figure 4:
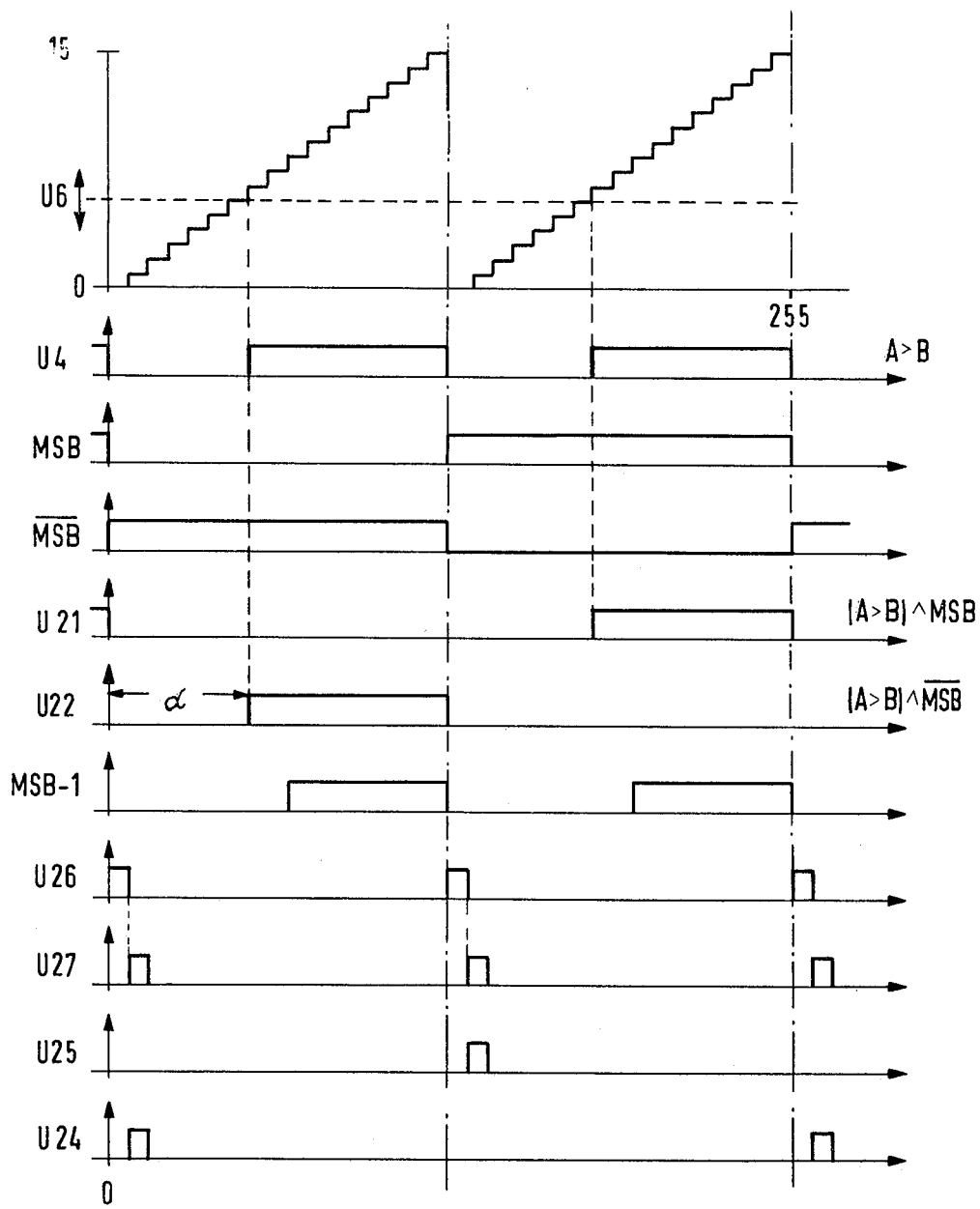
FIG. 4 illustrates essential wave forms in explanation of FIG. 3.

The control unit again comprises an 8-bit counter 2 and an oscillator 1, a function memory 3 and a comparator 4. For voltage regulation again a voltage regulator 5 is provided, whose output voltage is digitized in an analog-digital converter 6. The output signal U4 (see FIG. 4) of the comparator 4, the highest-value output signal MSB of counter 1, and the output signal lower by one digit, MSB-1, are fed to a logic circuit 20.

Logic circuit 20 contains the AND gates 21 and 22. One input of each of the AND gates 21 and 22 is occupied by the output signal U4 of comparator 4. The second input of AND gate 21 is occupied by the highest value signal MSB of counter 2. The second input of AND gate 22 is occupied by the highest value signal $\overline{MSB}$. The output signals U21 and U22 of the AND gates 21 and 22 determine the firing pulses for the controlled main valves V1 and V2. The control angle alpha is again determined by the comparison result.

Additional AND gates 24 and 25 are provided for the formation of the firing pulses for the controlled quenching valves V3 and V4. One input of AND gate 24 is occupied by the inverted highest-value signal $\overline{MSB}$. One input of AND gate 25 is occupied by the highest-value output signal MSB of counter 2. The second inputs of AND gates 24 and 25 are occupied by the output signal U27 of a timing stage 27, which in turn is triggered by the output signal U26 of a timing stage 26. Timing stage 26, which may be a flip-flop, is triggered at every falling flank of the signal MSB-1. The pulse duration of timing stage 26 corresponds to the interval between a firing pulse for a main thyristor and the next following firing pulse for a quenching thyristor. The pulse duration of timing stage 27, which also may be a flip-flop, corresponds to the duration of a firing pulse for a quenching valve. The output pulses U24 and U25 of the AND gates 24 and 25 energize the control electrodes of the quenching valves V3 and V4 via the pulse amplifier and transducer stages 28.

Figure 5A:
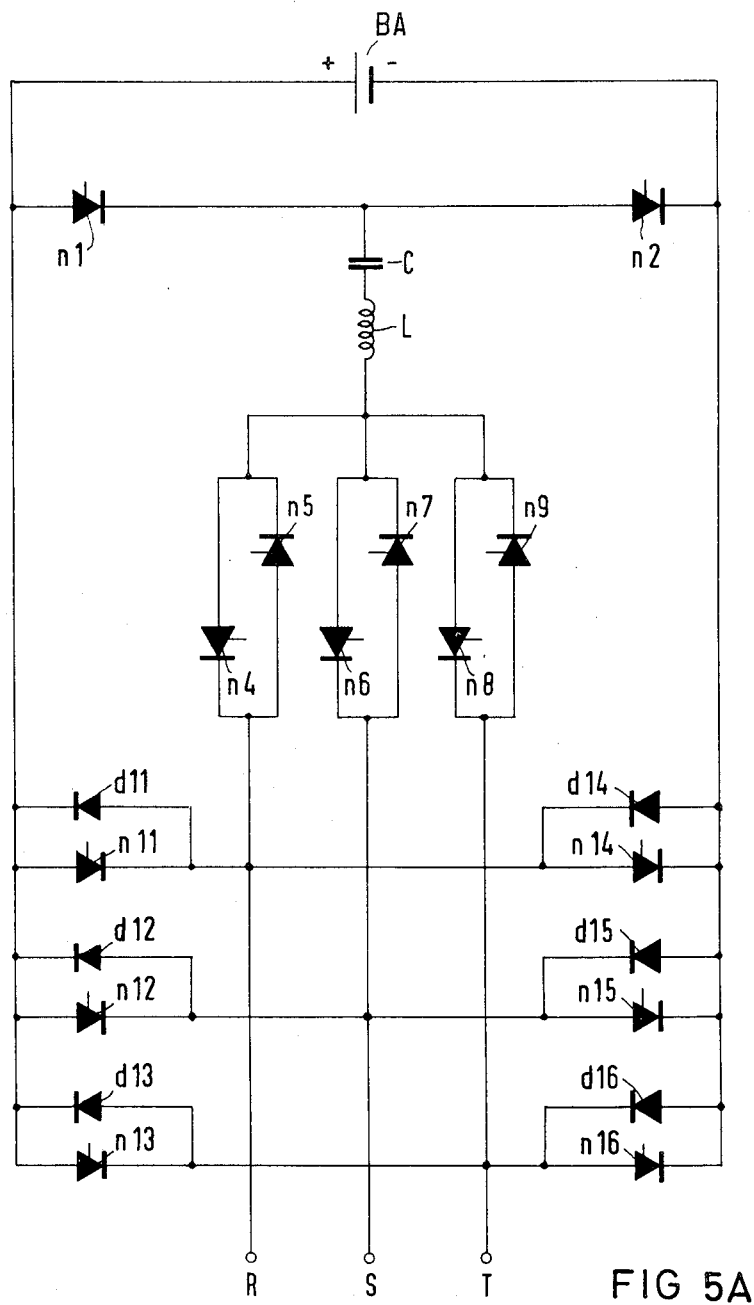
FIG. 5A is a schematic diagram of a known three-phase inverter.

FIG. 5A shows the circuit setup of a known, three-phase, six-pulse, static converter (Aircraft Electrical Power Seminar, May 10–11, 1977, Technical Proceedings, p. 59–68, New York, ACS 11,406, revised 3/78). As controllable valves there may be employed, in particular, thyristors, and as uncontrolled valves, in particular, diodes. For greater clarity, the protective circuitry of the valves is not shown. In the practical realization, all valves have RC elements connected in parallel with them and magnetic components associated with them for limiting the rate of voltage and current increase. Also circuit measures for influencing the commutation processes are known (McMurray, loc. cit. FIG. 16; German patent application DE-AS No. 23 23 905), which are not illustrated here.

The static converter is designed as a three-phase bridge inverter and converts the input DC voltage of a DC voltage source BA, e.g., of a battery or of a DC voltage intermediate circuit, into an AC voltage having the phases RST and forming a three-phase system. The bridge section for phase R contains the bridge branches with the controllable main valves n11 and n14. The bridge section for phase S contains the bridge branches with the controllable main valves n12 and n15. The bridge section for phase T contains the bridge branches with the controllable main valves n13 and n16. To each of the controllable main valves n11 to 16 recovery diodes d11 to d16 are connected antiparallel.

The controllable main valves n11 to n16 have associated with them, in common, as commutation circuit, a series resonant circuit with a commutation capacitor C and a commutation choke L. The lower terminal of the LC series resonant circuit is coupled, via an antiparallel connection of controllable auxiliary valves n4, n5, with phase R, via another antiparallel connection with the controllable auxiliary valves n6, n7, with phase S, and, via another antiparallel connection with the controllable auxiliary valves n8, n9, with phase T of the inverter. The upper terminal of the series resonant circuit is coupled via a controllable quenching valve n1 with the positive potential and via a controllable quenching valve n2 with the negative potential of the DC voltage source BA.

Figure 5B:
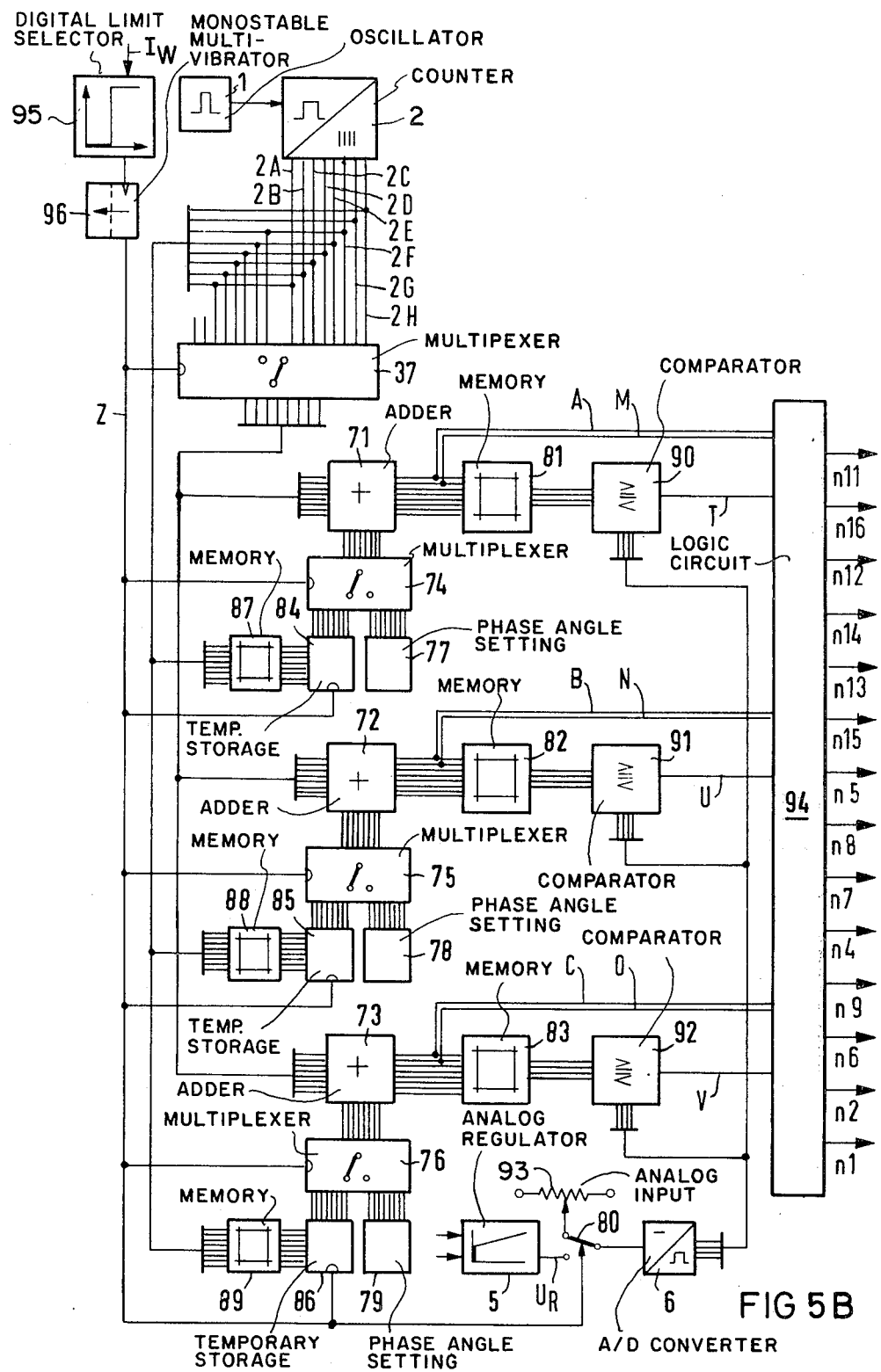
FIG. 5B is a block diagram of the control device for the drive of FIG. 5A.

FIG. 5B shows an embodiment of a control unit according to the invention for control of a three-phase static converter shown in FIG. 5A, which permits a particularly rapid stopping and subsequent operation with impressed current. The firing pulses of the control unit are sent to the control paths of the controllable valves via pulse amplifiers, preferably gatable pulse generators, and pulse transducers, or via optical or high-frequency transmission paths. Of importance for comprehension of the invention is only that the control unit generates firing pulses for the controllable valves of the static converter. The measures for the formation of a clock raster, customary in digital circuits, are not shown. The detailed information about the components used and the numerical data are to be understood to be given only by way of example.

The control unit contains the free-running oscillator 1, which generates a pulse sequence of constant pulse frequency of 12.8 kHz, for example. The 8-bit counter 2 divides the pulse frequency of oscillator 1 down. Counter 2 is operated as a forward counter with binary coding. At the counter outputs appear pulse sequences of a pulse frequency doubling each time: at counter output 2H there appears a pulse sequence of a pulse frequency of 50 Hz, at output 2G a pulse sequence of a pulse frequency of 100 Hz, etc., up to output 2A, at which there appears a pulse sequence of a pulse frequency of 6.4 kHz. The lowest pulse frequency of 50 Hz at output 2H is the desired frequency of the output voltage of the static converter, which in the following is termed operating frequency.

The outputs 2A ... 2H of counter 2 are connected to the first group of eight inputs of a two-channel, eight line multiplexer 37. The second group of inputs of multiplexer 37 is wired with the counter outputs 2A ... 2F and is thus shifted by two digits relative to the first group of inputs. The two inputs of the second group, not required, are continuously occupied by O signal. In accordance with a control signal at its control input, the multiplexer 37 connects through either the first or the second group of inputs to its outputs. Multiplexer 37 is controlled so that in undisturbed operation the counter reading is counter 2 is directly available at the outputs of multiplexer 37, while upon a disturbance the counter reading shifted by two digits is connected through to the outputs of multiplexer 37.

Figure 8:
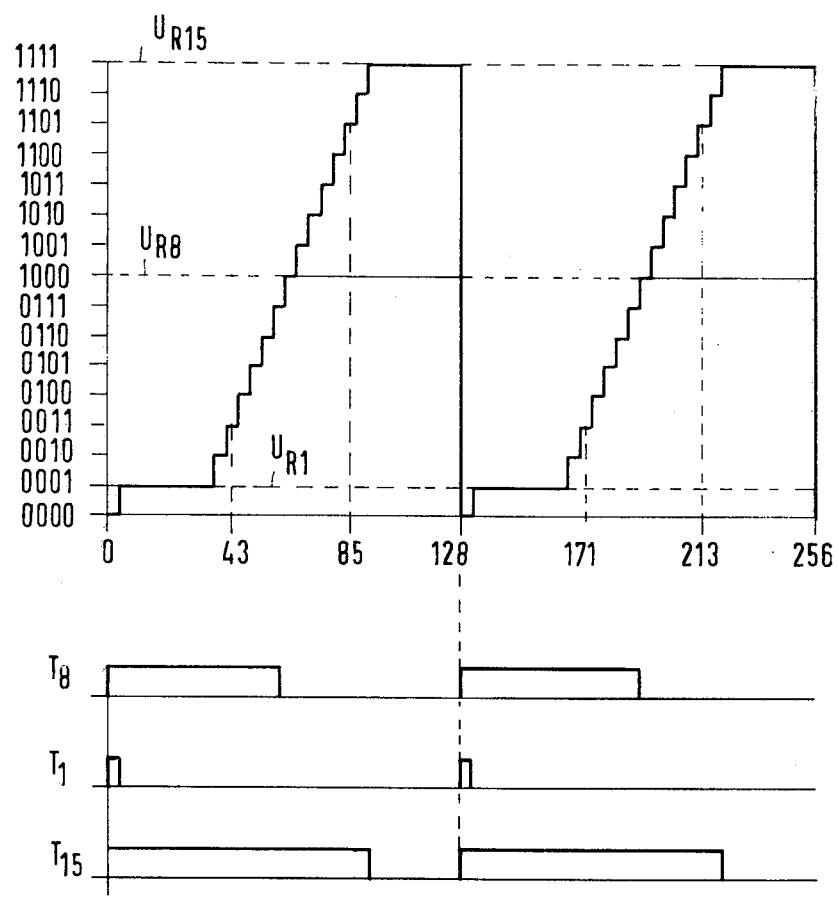

The three-phase firing pulse system required for driving the static converter is formed by addition of phase angle settings of 120°, electrical, or 240° electrical, to a reference phase. To this end, the outputs of multiplexer 37 are connected to the first summand inputs of adders 71, 72, 73. The second summand inputs of the adders 71, 72, 73 are connected to the outputs of additional two-channel, eight line multiplexers 74, 75, 76. The sum outputs of adders 71, 72, 73 are connected to the address inputs of memories 81, 82, 83, in which functions are stored. In the illustrated embodiment, these are 256×4 bit read-only memories in which sawtooth functions are stored. The programming of the function memories 81, 82, 83 is shown in FIG. 8. In undisturbed operation, the outputs of the multiplexers 74, 75, 76 are connected to the phase angle settings 77, 78, 79 wired to their first group of inputs. In case of disturbance, the additional multiplexers 74, 75, 76 can be reversed by a control signal to their control inputs in such a way that they switch through the signals of intermediate memories 84, 85, 86, which in turn are connected to further memories 87, 88, 89, which, in the illustrated embodiment, are 256×8 bit read-only memories.

The outputs of function memories 81, 82, 83 are connected to the first comparator inputs of digital comparators 90, 91, 92, whose second comparator inputs are connected to the outputs of the analog digital converter 6. The analog input of the analog-digital converter 6 is energized in unregulated operation, via a schematically represented switching device 80, by a fixed, given voltage, tapped, for example, by a potentiometer 93. In regulated operation, the switching device 80 is reversed and the analog input of analog-digital converter 6 is then energized with a control signal $U_R$ of regulator 5, e.g., a current regulator.

The outputs A and M of adder 71, occupied by the highest-value signals, as well as the corresponding outputs B and N of adder 72 and outputs C and O of adder 73, are connected to a logic circuit 94. Logic circuit 94 is further connected, on the input side, to the outputs T, U, V of comparators 90, 91, 92. Logic circuit 94 forms the firing pulses for the controlled valves n1 to n16. The construction of logic circuit 94 is described with reference to the logic equations and FIG. 5C.

In unregulated operation, the static converter shown in FIG. 5A is controlled with a fixed pulse pattern. Preferably a voltage regulation for the input DC voltage is provided which, however, is not of interest in this connection. According to the eight counter outputs of counter 2, each cycle of the output voltage of the static converter is divided into $2^8 = 256$ increments. The voltage tapped at the potentiometer 93 has a fixed value, which corresponds to full drive. The multiplexers are controlled in such a way that multiplexer 37 switches the counter output through to the first summand inputs of adders 71, 72, 73 directly and that multiplexers 74, 75, 76 switch the phase angle settings 77, 78, 79 through to the second summand inputs of adders 71, 72, 73.

The phase angle setting 77 is set to the number 0000 0000. The phase angle setting 78 is set to the number 01010101 (decimal: 85), which, at a negligibly small angle error, corresponds to a phase angle of 120° electrical. The phase angle setting 79 is set to the number 10101010 (decimal: 170), which approximately corresponds to a phase angle of 240° electrical. By the phase angle settings 77, 78, 79 the signals on the sum outputs of the adders 71, 72, 73 are shifted so that a three-phase system results which, except for negligibly small angle errors, forms a symmetrical three-phase system. Phase angle setting 77 could be eliminated with a fixed phase angle setting. It is, however, alternatively possible to provide phase angle settings where the setting values are formed, for example, by a phase angle regulator via an analog-digital converter, or by a phase angle computer.

Figure 6:
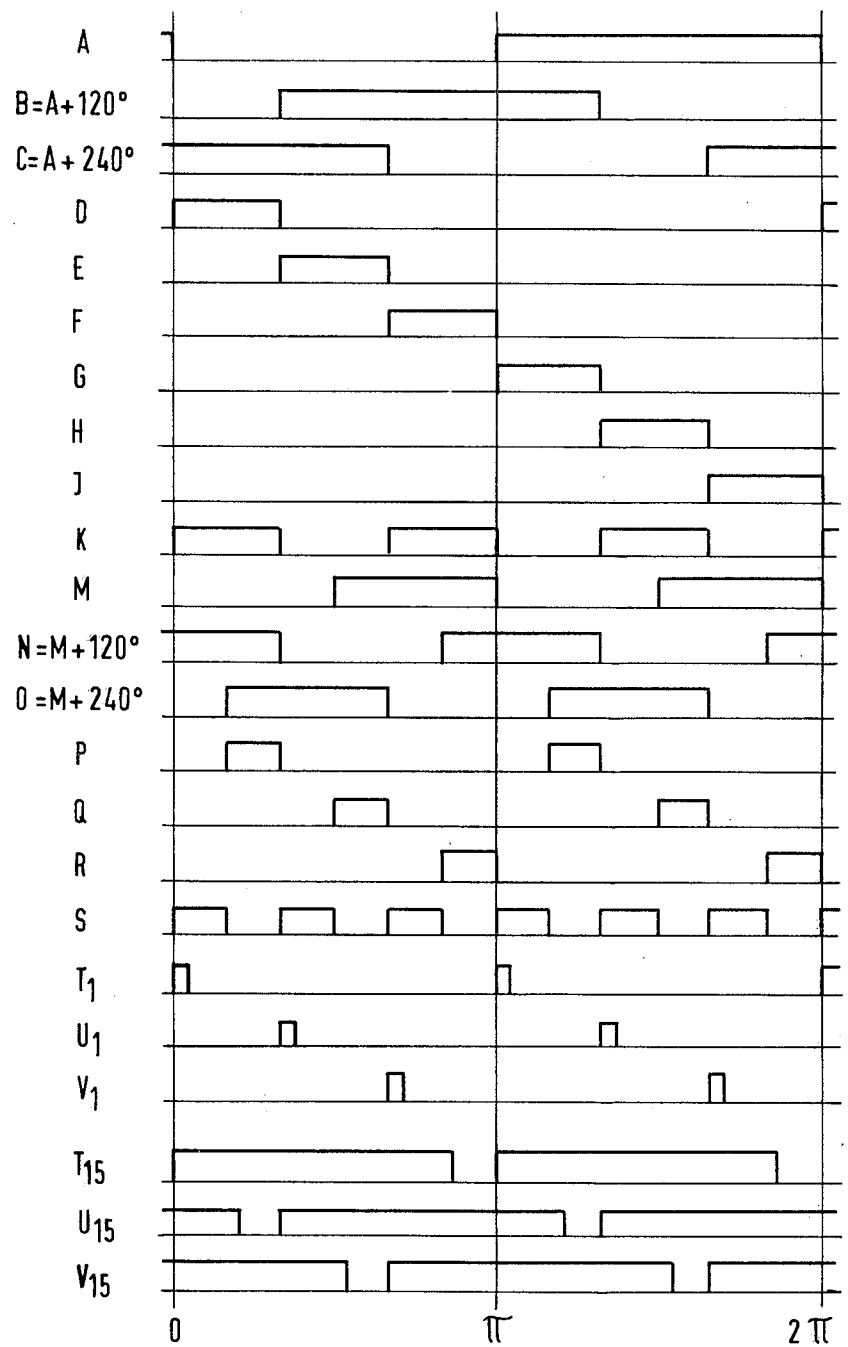
FIGS. 6–9 illustrate essential wave forms in explanation of FIGS. 5A, 5B and 5C.

Adders 71, 72, 73 continuously form the addresses for function memories 81, 82, 83. Outputs A and M of adder 71, outputs B and N of adder 72, and outputs C and O of adder 73 are occupied by signals whose form may be seen in FIG. 6 on the correspondingly designated lines. The signals A, B, C form at 180° raster. The signals M, N, O form a 90° raster. The saw-tooth functions stored in function memories 81, 82, 83 are compared in comparators 90, 91, 92 with the number available at analog-digital converter 6, which is taken as 0001 (decimal: 1). If the number given out by function memories 81, 82, 83 is, in accordance with the sawtooth function, smaller than the number given out by analog-digital converter 6, pulses will appear at the outputs T, U, V of comparators 90, 91, 92 which, in FIG. 6, are marked $T_1$, $U_1$, $V_1$.

The construction and operation of logic circuit 94 will be explained with reference to the circuit diagram shown in FIG. 5C and the diagrams in FIG. 6 and 7. The signals are marked with the reference symbols of the lines on which they are available. The firing pulses are marked with the reference symbols of the corresponding valves.

Figure 5C:
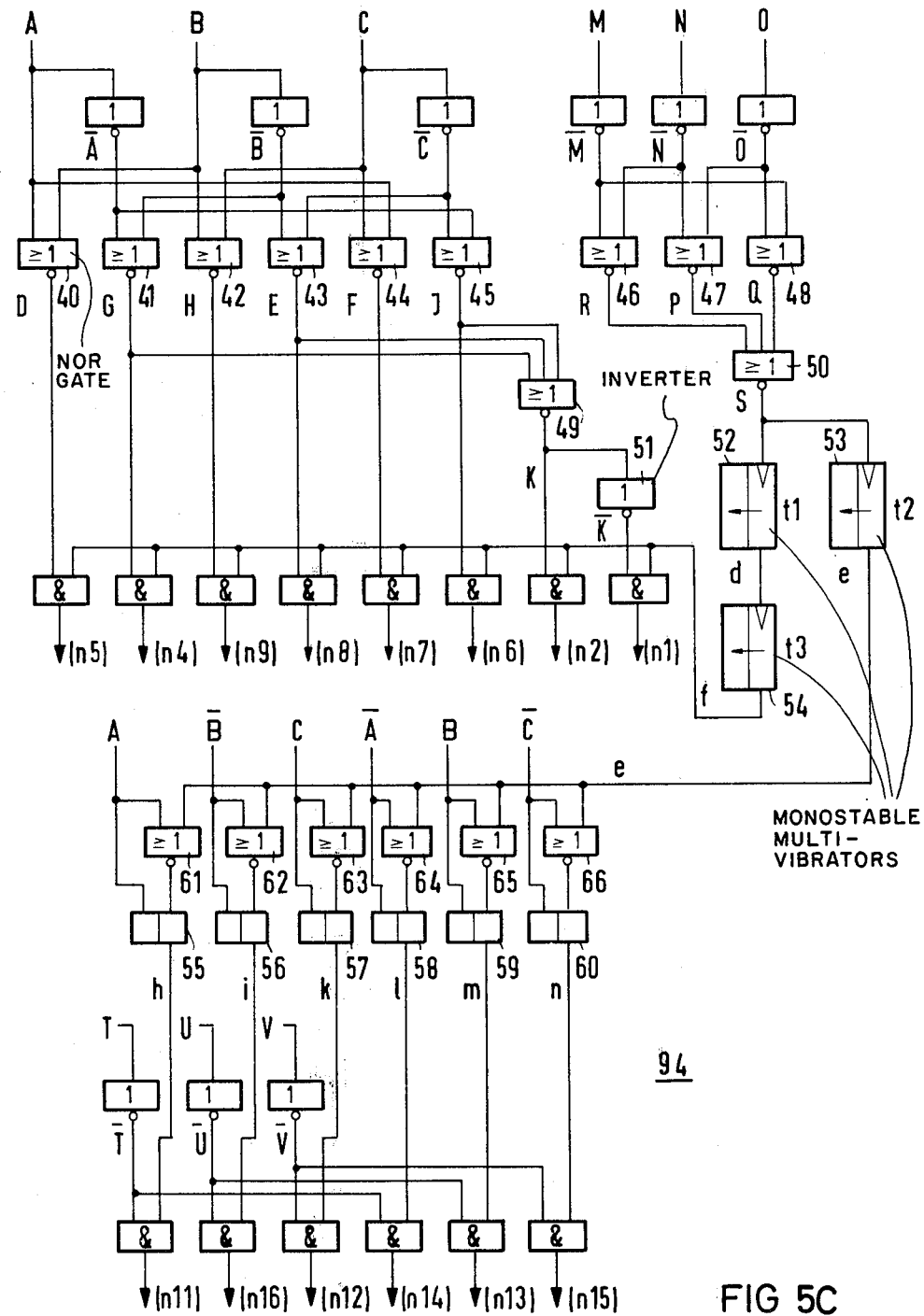
FIG. 5C is a diagram showing the internal wiring of the logic circuit in FIG. 5B.

FIG. 5C shows the construction of logic circuit 94 in a separate representation for the formation of firing pulses for quenching valves n1, n2 and auxiliary valves n4 to n9 as well as for main valves n11 and n15. The signals A, B, C, M, N, O supplied to logic circuit 94 on the input side from the sum outputs of the adders 71, 72, 73, and the drive signals T, U, V from comparators 90, 91, 92 are at first inverted in inverting elements not designated in detail. From the original and the inverted signals the signals D to J are formed in NOR gates 40 to 45 according to the following logic equations:

$D = \overline{A \vee B}$
$E = \overline{\overline{B} \vee \overline{C}}$
$F = \overline{A \vee \overline{C}}$
$G = \overline{\overline{A} \vee B}$
$H = \overline{\overline{B} \vee C}$
$J = \overline{\overline{A} \vee C}$ The pulses D . . . J are 60° pulses. From these pulses a signal K is composed as a 60° raster by linkage in the NOR gate 49:

$K = \overline{E \vee G \vee J}$ Signal K is inverted in the inverting element 51.

From the signals M, N O and $\overline{M}$, $\overline{N}$, $\overline{O}$ the signals P, Q, R are formed in NOR gates 46 to 48:

$P = \overline{\overline{N} \vee \overline{O}}$
$Q = \overline{\overline{M} \vee \overline{O}}$
$R = \overline{\overline{M} \vee \overline{N}}$ The signals P, Q, R are 30° raster pulses linked in the NOR gate 50 to compose the signal S, which represents a 30° raster:

$S = \overline{P \vee Q \vee R}$

Time pulses d, e, f are formed from the signal S by monostable multivibrator stages 52, 53, 54. Monostable multivibrator stage 52, having a transit time t1, and monostable multivibrator stage 52, having a transit time t2, are triggered at the rising flank of each signal S. The output signal d of monostable multivibrator stage 52 triggers the monostable multivibrator state 54, having a transit time t3. Time t1 is the interval between the end of a main pulse and the beginning of the next following quenching pulse. Time t2 is the interval between the end of a firing pulse for a main valve and the beginning of the firing pulse for the opposite main valve. Time t3 is the pulse duration of the quenching pulses.

The output signal f of stage 54 is linked, in AND gates not specifically designated with the signals D to J to provide the firing pulses for the auxiliary valves n4 to n9, as well as in further AND gates with the signals K and $\overline{K}$ to provide firing pulses for the quenching valves n1, n2:

$n5 = D \wedge f$
$n8 = E \wedge f$
$n7 = F \wedge f$
$n4 = G \wedge f$
$n9 = H \wedge f$
$n6 = J \wedge f$
$n1 = \overline{K} \wedge f$
$n2 = K \wedge f$ To form the firing pulses for the controlled main valves n11 to n16, the output signal e of stage 53 is linked with the signals A, B, C, $\overline{A}$, $\overline{B}$, $\overline{C}$ in NOR gates 61 to 66. The outputs of NOR gates 61 to 66 are connected to the set inputs of bistable multivibrator stages 55 to 60, whose reset inputs are occupied by one of the signals A, $\overline{B}$, C, $\overline{A}$, B, $\overline{C}$. The firing pulses for the main valves n11 to n16 are formed from the signals h to n at the outputs of the multivibrator stages 55 to 60 by conjunctive linking with the inverse drive signals T, U, V.

$n11 = \overline{T} \wedge h$
$n16 = \overline{U} \wedge i$
$n12 = \overline{V} \wedge k$
$n14 = \overline{T} \wedge 1$
$n13 = \overline{U} \wedge m$
$n15 = \overline{V} \wedge n$ The drive signals T, U, V determine the drive of the static converter. For unregulated operation of the static converter, the drive signals can be preset fixed, for example by monostable multivibrator stages, which are triggered by suitable signals at the outputs of the adders. The drive signals T, U, V for full drive T1, U1, V1 and for minimum drive T15, U15, V15 are shown in FIG. 6. It can be seen that, for example, the drive signal T can be formed by monostable multivibrator stages which are triggered by the rising flank of signal D or by the rising flank of signal G, and whose transit time is adjusted to the desired duration of the drive signal. In the same way drive signals U and V can be derived from the signals E and H and F and J, respectively. Changes in drive control can be made by appropriate changes in the transit times of the multivibrator stages.

The present embodiment shows a different way of doing this. The drive signals T, U, V are formed by digital comparison of a regulating signal with the output ssignals of function memories. First the programming of a function memory for this purpose is explained, with reference to FIG. 8.

FIG. 8 shows as a graph the programming of function memory 81. On the horizontal axis, the addresses are described in decimal notation, and on the vertical axis, the memory contents which can be called up by means of the respective addresses, in binary representation. The memory contents consist of the numbers 0 to 15. For example, when applying the address 85, function memory 81 gives out the binary number 1101 decimal: 13) or, when applying the address 171, the binary number 0011 (decimal: 3). If the addresses 0 to 255 are successively applied by the adder 71, numbers appear at the memory outputs, which in the graphic representation form two successive sawteeth of a stepped form caused by the digitization. The drive signal T for the main valves n11 to n14 is formed from this by digital comparison with a regulating signal $U_R$ in comparator 90. For example, for a regulating signal $U_{R8}$ which is converted into the number 1000 (decimal: 8), a drive signal $T_8$ results. Maximum drive of the static converter occurs at a regulating signal $U_{R1}$, which is established as 0001 (decimal: 1), the drive signal T1 being formed by digital comparison between $U_{R1}$ and the numbers read out from the function memory. At minimum drive, a drive signal T15 is formed by digital comparison of the regulating signal $U_{R15} = 1111$ (decimal: 15). The drive signals already shown in FIG. 6, e.g., T1, U1, V1 for full drive and T15, U15, V15 for minimum drive, but which can be changed by the described digital comparison as a function of a regulating signal in intermediate stages, are formed in this way.

The realization as to circuitry of the described formation of the drive signals is also shown in FIG. 5B. Regulator 5 generates a regulating signal $U_R$, which is converted by the analog-digital converter 6 into a number between 0001 (decimal: 1) and 1111 (decimal: 15). The digitalized regulating signal is compared in comparators 90, 91, 92 with the numbers read out from function memories 81, 82, 83. The drive signals T, U, V are high when the digitalized regulating signal is greater than the read-out number.

In programming the function memories, other functions can be also introduced, e.g., ramp functions with different slopes. In particular, non-linear relationships between the regulating signal and the desired drive can also be taken into account in a simple manner by appropriate programming.

FIG. 5B shows a way of switching between regulated and unregulated operation. The analog input of analog-digital converter 6 is connected via switching device 80 either with the output of regulator 5 or of potentiometer 93. In unregulated operation, switching device 80 is in the position shown. A voltage is set by potentiometer at which a number corresponding to the desired drive is passed on by the analog-digital converter 6, for example the number 0001 for maximum drive with the drive signals $T_1$, $U_1$, $V_1$.

The inverter shown in FIG. 5A has only one LC series resonant circuit as commutation circuit for all main valves. Upon rapid shutdown of the inverter due to a protection command, therefore, the live main valves cannot all be quenched simultaneously by the appropriate firing pulses. Instead, there is danger that, in case of shortcircuits in a connected load, the shortcircuit current will increase to values at which the commutation capacity of the inverter is exceeded. Therefore, the measures described below are provided so as to be able to stop the inverter quickly in case of a protection command.

For the formation of a protection command, for example, the output current $I_W$ of the inverter is measured, by means not shown, and supplied as a proportional signal to a digital limit selector 95. If the output current of the inverter exceeds a given limit value, selector 95 will change its output signal and trigger a monostable multivibrator stage 96, which generates a pulse Z (see also FIG. 9) of given duration, e.g., 6.7 msec. By means of the pulse Z from monostable multivibrator stage 96, a rapid shutdown of the inverter is initiated. To this end the firing pulses for the controlled main valves n11 to n16 of the inverter are cut off. Furthermore, the operating frequency is increased, preferably to a multiple of the normal operating frequency, and the phase position of the system of higher operating frequency is changed relative to the system of normal operating frequency. The higher operating frequency is selected so that the minimum times specified for the valve types used in the inverter circuit are respected. These minimum times result from the design of the components of the commutation circuit, the maximum current to be commuted, and the recovery time of the valves. If, as increased operating frequency, a $2^n$ multiple of the normal operating frequency is selected, the frequency increase can be carried out very simply by shifting the counter outputs by n digits by means of multiplexer 37. In the illustrated embodiment of FIG. 5B, the second group of inputs of multiplexer 37 is wired to counter outputs 2A ... 2F and is thus shifted by two digits relative to the first group of inputs. By means of the pulse from monostable multivibrator stage 96, used as control signal multiplexer 37 is reversed, so that the counter reading, shifted by two digits, appears at its outputs which is thus supplied to the first summand inputs of adders 71, 72, 73. At the same time, the other multiplexers 74, 75, 76 are reversed and a transfer pulse is sent to memories 84, 85, 86. The memories 84, 85, 86 store the numbers temporarily available at the outputs of further memories 87, 88, 89, and these numbers are now connected to the second summand inputs of adders 71, 72, 73, via multiplexers 74, 75, 76, instead of the phase angle settings 77, 78, 79. Adders 71, 72, 73 now add the counter reading, shifted by two digits, to the numbers from memories 87, 88, 89 at the moment of disturbance. Displacement of the counter reading by two digits corresponds to a quadruplication of the operating frequency. Additional memories 87, 88, 89 are programmed in such a way that a pulse shift for all firing pulses occurs which is dependent on the counter reading at the moment of disturbance and, hence, on the instantaneous value of the phase voltages of the static converter. This will now be explained specifically with reference to the diagrams of FIG. 9.

Figure 7:
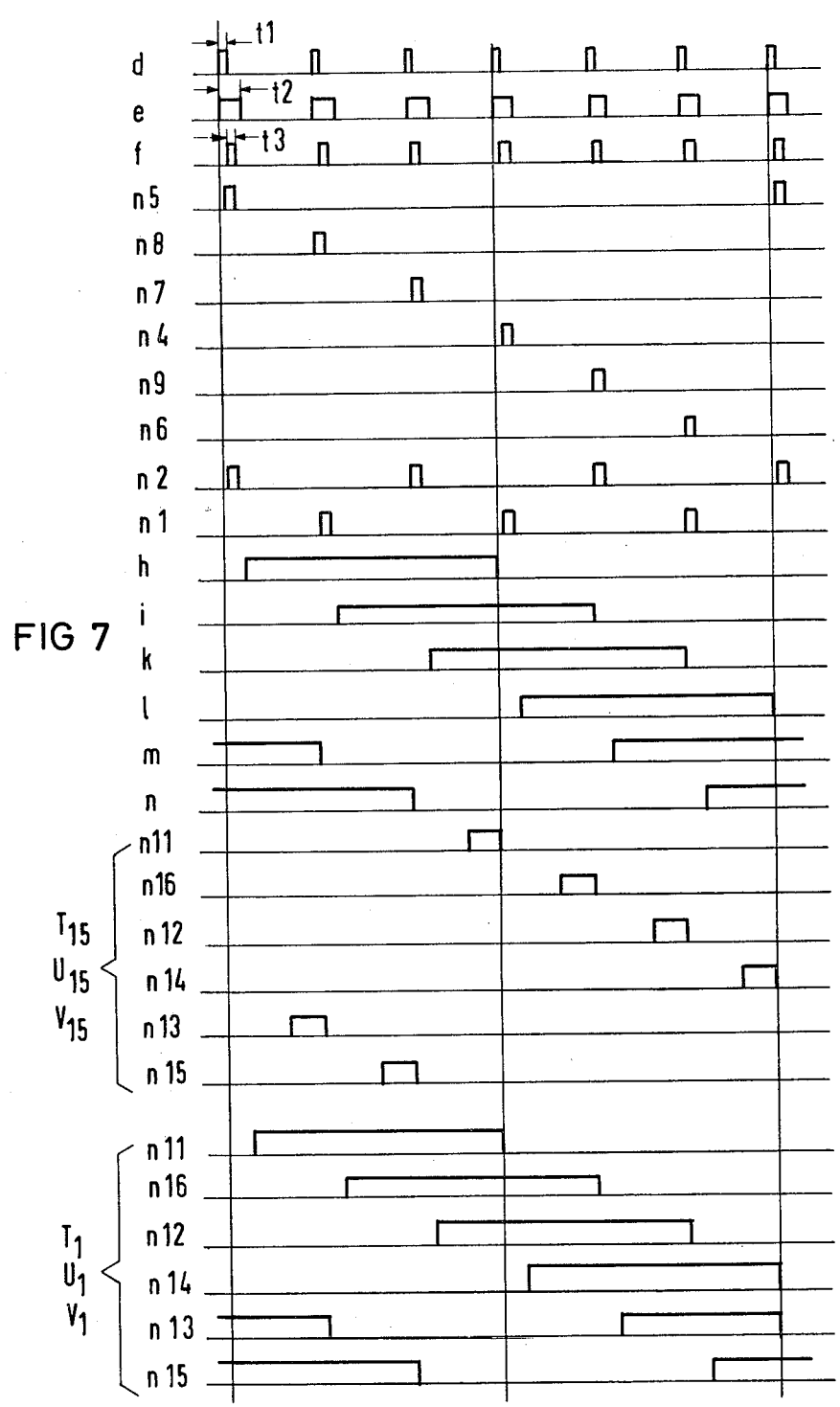
Figure 9:
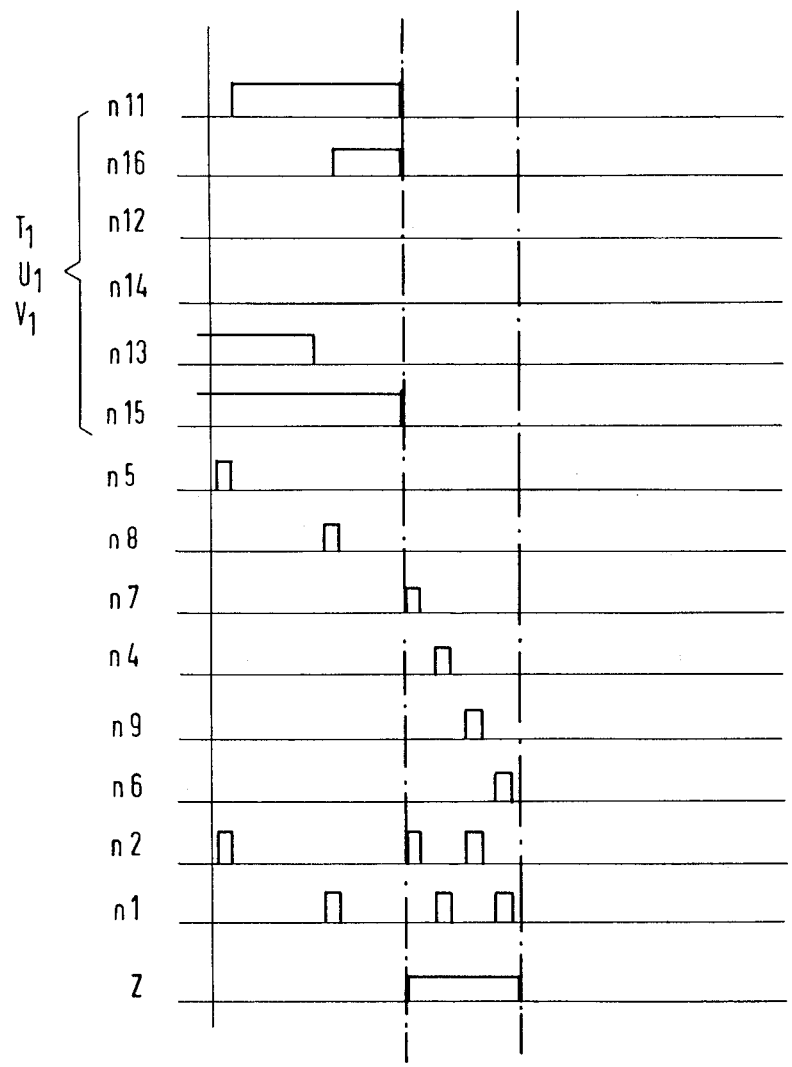

FIG. 9 shows, in concordance with FIG. 7, the firing pulses from the main valves n11 to n16 at maximum drive, as well as the firing pulses for the quenching valves n1, n2 and for the auxiliary valves n4 to n9 at normal operating frequency. Signal Z of the multivibrator stage 96 controls the stopping process. During the rising flank of pulse Z the firing pulses for the main valves are cut off, a shift of the firing pulses for the quenching valves and auxiliary valves is effected, and the operating frequency is increased. In addition, during the falling flank of pulse Z, the firing pulses for the quenching valves and auxiliary valves are also cut off. The static converter is stopped.

The displacement of the firing pulses for the quenching valves is based on the realization that one should not wait, in the case of a rapid shutdown, until the next quenching pulse is formed in the normal rhythm, but that the next quenching pulse should be formed immediately after the stop command. If the stop command coincides with a quenching pulse, this quenching pulse is repeated, to make sure that the associated main valve is actually quenched. If, however, the stop command falls between the quenching pulses, the pulse raster is shifted in time in such a way that the next quenching pulse appears immediately.

For every instant it is possible to provide a displacement of the firing pulses for the quenching valves which permits shutdown of the static converter optimally as to time. To be able to realize the pulse raster displacement upon rapid shutdown with simple circuitry, it is expedient to divide a cycle of the output voltage of the static converter into a number of zones and to determine the displacement as a function of the zone into which the rapid shutdown falls.

The additionally provided increase of the operating frequency further accelerates the stopping process and ensures synchronism between the firing pulses for the quenching valves and the firing pulses for the auxiliary valves, in the special inverter described.

In the representation of FIG. 9, during the rising flank of the stop command Z, main valves n11, n16, n15 are live and are to be quenched optimally as to time. The pulse raster of the firing pulses for the quenching valves and auxiliary valves is shifted forward in time far enough for the firing pulses for valves n2 and n7 to come immediately, followed by the firing pulses for valves n1 and n4, which are followed by the firing pulses for valves n2 and n9. The main valves n15, n11 and n16 are quenched in this order. The static converter is stopped. For safety reasons the stop command Z persists a while longer.

The circuitry for this purpose is illustrated in FIG. 5B. Upon rapid shutdown, the second summand inputs of adders 71, 72, 73 are connected to the read-only memories 87, 88, 89 via multiplexers 74, 75, 76 and the intermediate memories 84, 85, 86. The address inputs of read-only memories 87, 88, 89 are connected to the outputs of counter 2. Read-only memories 87, 88, 89 are programmed in such a way that at every counter reading a number is read out which, upon addition with the counter reading or with the counterreading shifted by one or more digits, results in signals at the outputs of the adders for bringing about suitable firing pulses, via the logic circuit 94, for the quenching valves and auxiliary valves to stop the static converter optimally as to time. Upon rapid shutdown, therefore, multiplexers 37, 74, 75, 76 are reversed and a transfer command for intermediate memories 84, 85, 86 given. Not shown specifically are the cutting off of the firing pulses for the main valves, which can be effected for example by suitable cutoff gates, and also the subsequent cutting off of the firing pulses for the quenching valves and auxiliary valves.

What is claimed is:

1. Apparatus for regulating the output of a static converter, the converter having valves controlled by firing pulses, by supplying firing pulses to the converter, comprising:
   an oscillator;
   a counter driven by the oscillator and having a predetermined sequence of address signals as an output;
   a read only memory having an output and having an input coupled to the output of the counter, the memory being programmed to provide a sequence of digital outputs approximating a predetermined function in response to a predetermined sequence of address signals at the address input;
   a comparator having first and second sets of inputs and having a drive control signal as an output, the first set of inputs being coupled to the output of the memory;
   means, coupled to the second set of inputs of the comparator, for providing a digital control signal representing the drive of the static converter; and
   logic means, having the drive control signal as an input and responsive to at least one output signal from the counter, for providing firing pulses to control the valves in the static converter.

* * * * *